April 9, 1935.  L. L. WITTER  1,996,944
LIQUID DISPENSING DEVICE
Filed March 1, 1933  2 Sheets-Sheet 1
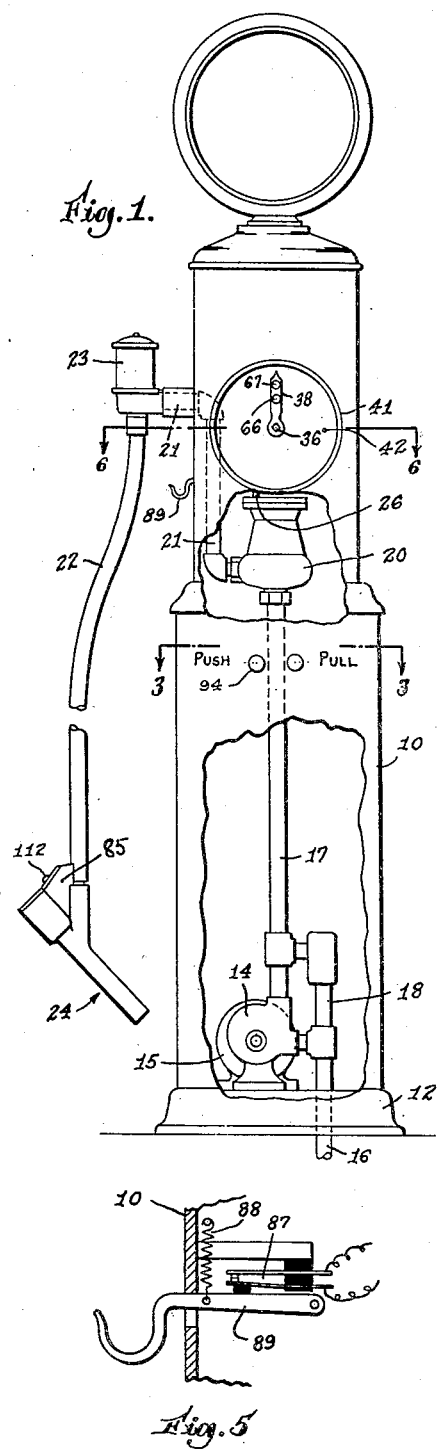
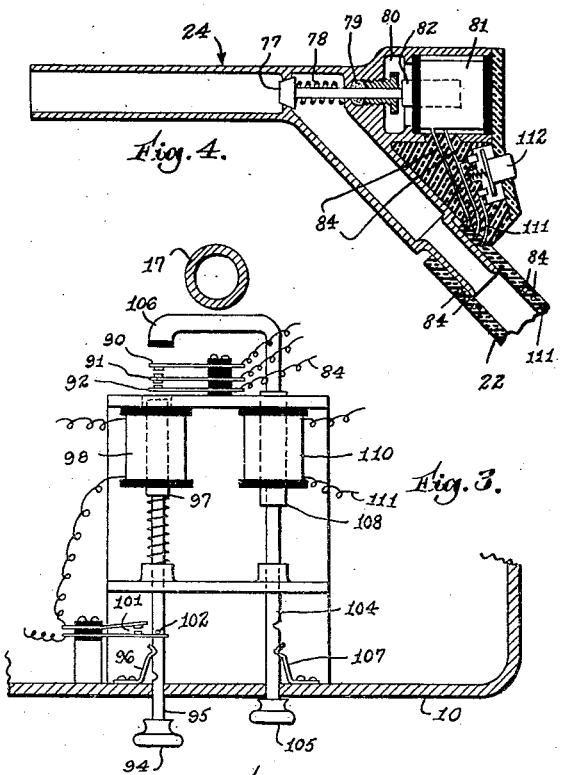
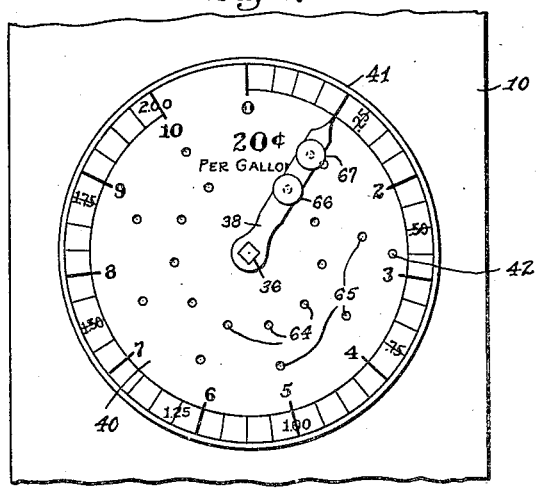
Inventor
Lawrie L. Witter

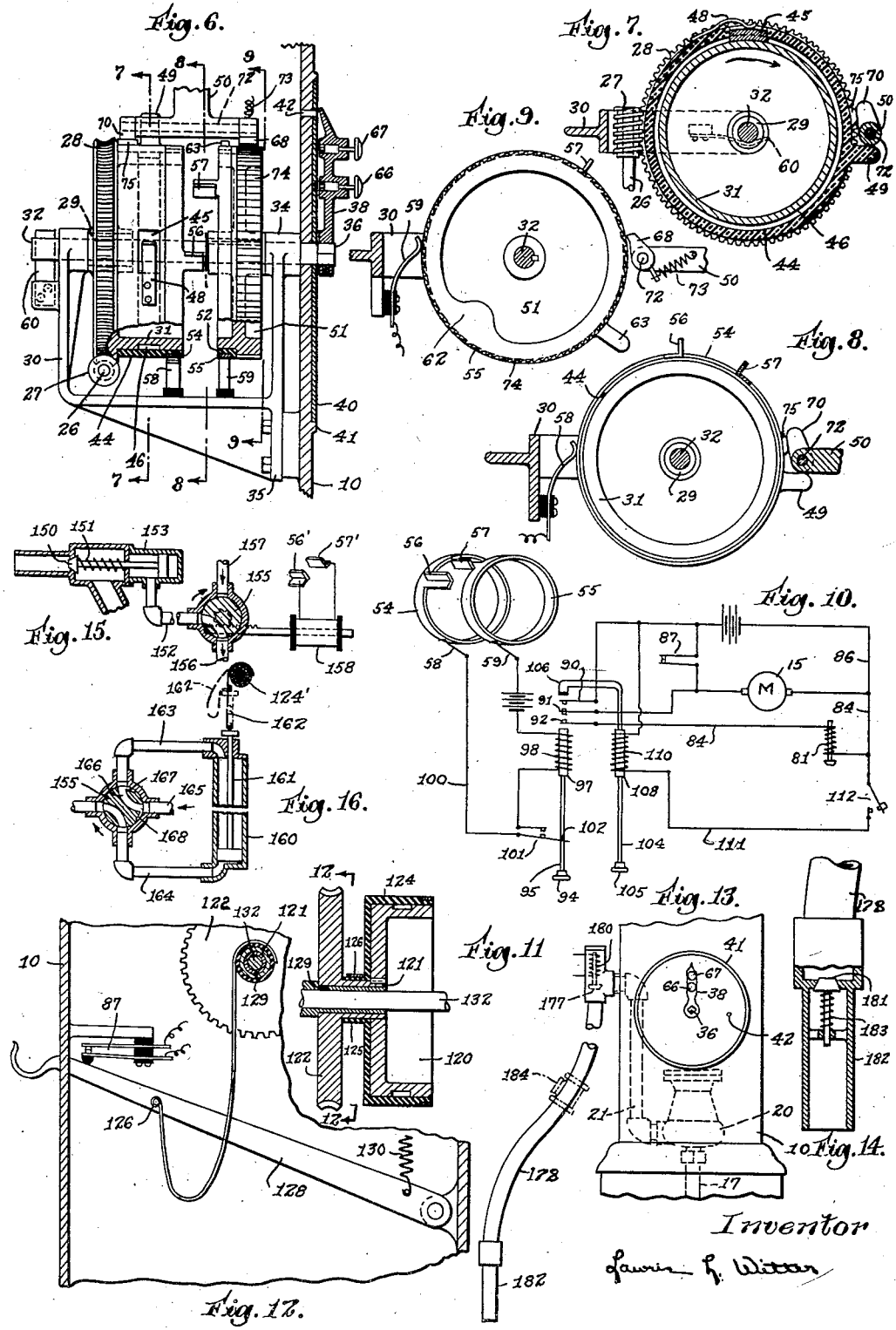

Patented Apr. 9, 1935

1,996,944

UNITED STATES PATENT OFFICE 1,996,944

LIQUID DISPENSING DEVICE

Lawrie L. Witter, Jamaica Plain, Mass.

Application March 1, 1933, Serial No. 659,145

15 Claims. (Cl. 221—101)

This invention relates to liquid dispensing devices and more especially to devices for dispensing gasoline and the like. The gasoline pumps now in common use for this purpose are constructed to dispense in quantity amounts, as by the gallon, which is very inconvenient and troublesome due to the odd price of gasoline per gallon and, therefore, the fractional amount due for each sale, this amount usually being a few odd cents below or above an even dollar. One object of my invention is the production of an improved dispensing device of the meter-measuring type by which gasoline or other liquids can be dispensed in amounts corresponding to desired or predetermined money values rather than in amounts corresponding to volume measurements.

I am aware that meter-measuring dispensing devices have heretofore been proposed which measure or compute the money value of the amount of liquid dispensed but these devices require great care and accuracy on the part of the attendant and leave much possibility for errors. A purchaser of gasoline usually desires a volume corresponding to a predetermined money value, and in the devices heretofore known this volume can be dispensed only by closely watching the register and stopping the pump when the corresponding figure has been reached. The accuracy of such devices, therefore, depends to a large degree upon the eye and efficiency of the attendant, whereby discrepancies and losses may occur. My invention herein provides adjustable stop means which may be conveniently set to a position corresponding to the value amount of liquid it is desired to dispense and which will automatically stop the dispensing operation when the meter has reached that position. A value graduated member or dial cooperates with the setting means, and this member may be conveniently removed and replaced by another graduated member whenever the price of the liquid is changed.

While, as above described, my invention deals primarily with a dispensing device adapted to dispense a predetermined money value amount of liquid, the same is also adapted to dispense any desired amount, of known or unknown volume, and thereupon clearly indicate the money value thereof. The production of a liquid dispensing device of this and the above-defined nature which is of relatively simple construction and definite in operation, whereby a minimum amount of supervision is required by the attendant, comprises a further object of the invention.

These and other features of the invention will be best understood and appreciated from the following description of a preferred embodiment thereof, selected for purposes of illustration and shown in the accompanying drawings, in which Fig. 1 is a front elevation, partially broken away, of a gasoline pump embodying my invention;

Fig. 2 is an enlarged view of the indicating dial;

Fig. 3 is an enlarged and fragmentary view taken on line 3—3 of Fig. 1;

Fig. 4 is an enlarged sectional view through the dispensing nozzle;

Fig. 5 is a fragmentary detail view of the motor-controlling switch;

Fig. 6 is a plan view taken approximately on line 6—6 of Fig. 1;

Figs. 7, 8 and 9 are sectional views taken on lines 7—7, 8—8 and 9—9 of Fig. 6;

Fig. 10 is a wiring diagram showing the electrical connections;

Fig. 11 is a fragmentary sectional view of a modified feature of the invention;

Fig. 12 is a fragmentary view taken on line 12—12 of Fig. 11;

Fig. 13 illustrates another modified feature of the invention;

Fig. 14 is an enlarged sectional view through the dispensing nozzle shown in Fig. 13; and Figs. 15 and 16 are fragmentary sectional views showing a further modified form of the invention.

In Figs. 1-10 of the drawings is illustrated a casing 10 supported on a base 12 and housing mechanism for dispensing gasoline from an underground tank. The mechanism within the casing comprises a pump 14 driven from an electric motor 15 and adapted to deliver gasoline from the tank through piping 16 and 17, the usual relief bypass 18 being provided around the pump. The pipe 17 is connected to a meter 20, of any desired and well-known construction, and an outlet pipe 21 from the meter has the usual hose 22 attached thereto, a sight glass being shown at 23. A nozzle 24 attached to the free end of the hose, and shown in section in Fig. 4, is hereinafter more specifically described.

It will be understood that all liquid dispensed must pass through and operate the meter 20, and a shaft 26 extending from the meter is driven through suitable gearing therefrom. A worm 27 on the shaft (Fig. 6) is in mesh with a worm gear 28 mounted to rotate on a fixed sleeve 29 carried on a supporting bracket 30, a drum 31 being carried by and preferably integral with the gear.

The drum is positively rotated by the meter in the direction of the arrow (Fig. 7).

A shaft 32 has one end extending through and supported by the sleeve 29 and bracket 30 and its other end is supported by a bracket 34, the brackets 30—34 being mounted on the casing at 35. The front end of the shaft extends outwardly through the casing 10 and has a squared end 36 on which is mounted an indicator 38. The amount of liquid dispensed is determined by the rotation of the shaft 32, as shown by the position of the indicator relative to the graduations on a dial 40. This dial is positioned over the shaft and within a circular flange 41 on the casing and is rotatably positioned by a lug 42 extending through a hole in the dial.

A sleeve 44 of insulation material is mounted on the drum 31 and is normally prevented from rotation thereon by a friction shoe 45 extending through a hole in the sleeve and engaging within a groove 46 formed within and around the drum, a spring 48 holding the shoe in contact with the drum. A stop lug 49 on the sleeve cooperates with a fixed bracket 50 for limiting rotation of the sleeve in the rearward direction. A drum 51, keyed to the shaft 32, has a ring 52 of insulation material fixed thereto. Fixed onto the sleeve 44 and ring 52 are two metallic bands 54 and 55 provided with contact abutments 56 and 57, respectively, and brushes 58 and 59 are in contact with the bands 54 and 55. The shaft 32 may be prevented from free rotation by a light friction spring 60 and the weight of the indicator 38 may be counterbalanced by adding metal to the drum 51 at 62.

When the indicator is rotated anti-clockwise, the contact 57 engages the contact 56 and rotates the sleeve rearwardly on the drum 31 and, when such rotation is arrested by the stop 49 engaging the bracket 50, the indicator is at the zero position on the dial. In Figs. 2 and 6–9, the sleeve 44 is shown in its rearmost position and the indicator and its drum 51 are illustrated as set forwardly to the one gallon dispensing position. Forward rotation of the indicator and its drum 51 is limited by a stop lug 63 on the drum coming into contact with the bracket 50, and forward rotation of the sleeve 44 is limited by its contact 56 engaging with the contact 57. When the drum 51 is in such foremost position, the indicator is at the 10 gallon dispensing position illustrated in Fig. 2.

The dial 40, shown in Fig. 2, is graduated in gallons from 1 to 10 inclusive and also in the value amount thereof at 20¢ per gallon. The dial is also provided with a series of perforations 64 disposed in alignment with the volume indices and another series of perforations 65 disposed in alignment with the value indices. Carried by the indicator are two detents for engaging respectively within the perforations 64 and 65, the detents being operated by knobs 66 and 67. Thus, the indicator and its drum can be set to correspond with either the volume or value positions indicated. When the indicator is thus set and the dispensing operation started, such operation is automatically interrupted as hereinafter described, when the contact 56 reaches a fixed or constant predetermined position relative to the contact 57 in which position they are in contact.

It will be understood that the sleeve 44 must be returned to zero position prior to each dispensing operation and this restoring movement may be effected in any convenient and desired manner. In Figs. 6–9, the restoring is performed by moving the indicator rearwardly, as above described, until the stop 49 engages with the bracket 50. An interlock, including a pawl 68 and dog 70 on a shaft 72 in the bracket 50, is provided for preventing forward setting movement of the indicator until the sleeve has been restored to initial position. A spring 73 normally engages the pawl with ratchet teeth 74 on the drum 51 and a lug 75 is so located on the sleeve as to raise the dog and pawl when the sleeve is in its zero position. Thus, the indicator can be adjusted forwardly only when the sleeve is in its initial or zero position.

The flow of gasoline through the meter is controlled by a valve 77 in the nozzle 24 and this valve is normally held in its closed position by a spring 78. The valve stem extends through a stuffing box 79 and into a closed chamber 80. A solenoid, within the chamber and comprising a coil 81 and a co-operating armature core 82 on the rod, serves when energized to open the valve against the action of the spring. The wires 84 from the coil pass through an insulation block 85 and are built into and extend around the hose to the casing 10.

The mechanism for controlling the dispensing operation is shown in Figs. 3 and 4 and in the wiring diagram of Fig. 10. The motor 15 is in a circuit 86, including a shunt switch 87 normally closed by a spring 88 when the hose is removed from the hook 89 (Fig. 5). The circuit 86 also includes two elements 90 and 91 of a switch having a third element 92 connected to one of the wires 84 extending through the coil 81. The switch 90—92 is adapted to be closed by pushing inwardly on a knob 94 mounted on a rod 95, the rod being provided with two notches cooperating with a spring 96 for holding the rod in either of its two positions. The rod has an armature core 97 thereon cooperating with a coil 98 within a circuit 100 having its terminals connected to the brushes 58 and 59. A normally closed switch 101 in this circuit has one element thereof in the path of movement of a pin 102 on the rod 95, whereby the switch is open when the rod is in its outermost position. The arrangement is such that pushing the knob 94 inwardly closes the switch 90—92, thus energizing the solenoid 81 and opening the valve 77. The closing of the switch 90—92 also closes the circuit through the motor, thus preventing the possibility of opening the valve without operating the motor, as would otherwise be possible by holding the hook 89 down manually after removing the hose therefrom.

The operation of the mechanism to dispense a predetermined amount of gasoline may be briefly described as follows, it being assumed that the indicator 38 and cooperating parts are in the zero or initial position and that the motor switch 87 has been closed by removing the hose from its hook 89. The operator sets the indicator 38 to a position corresponding to the volume or value amount of liquid to be dispensed and plugs the detent 66 or 67 into the corresponding perforation in the disk 40. This operation has set the contact 57 a corresponding distance from the contact 56. The operator then pushes the knob 94 inwardly, whereupon the switches 90—92 and 101 are closed and the valve 77 is opened. The dispensing operation proceeds until the contact 56 engages the contact 57, whereupon the solenoid 98 is energized and moves the rod 95 to its outer position, thus causing the switches 90—92 and 101 to open and the valve 77 to close. The operator restores the indicator and its cooperating parts to the initial position by withdrawing the knob 66 or 67 and rotating the indicator backwardly to engage the stops 49—50. It will, of course, be understood that as the price per gallon changes, other disks 40, graduated accordingly, may be substituted for the 20¢ per gallon disk illustrated.

A rod 104, having a knob 105 on its outer end, has its inner end 106 so positioned as to close the switch 90—92 when the knob is drawn outwardly, a spring 107 being adapted to engage within either of two notches in the rod and thus hold the rod in either of its inner or outer positions. The operation of this control for dispensing an unknown quantity of liquid, commonly called a "fill-up", is substantially as follows, it being assumed that the indicator 38 and cooperating parts are in the initial position. Drawing the knob outwardly causes the valve 77 to open and starts the dispensing operation, during which operation the indicator 38 is rotated with the drum 31. The operation is stopped merely by pushing the knob inwardly and the position of the indicator on the dial points directly to the volume and value amount of liquid dispensed. If desired, a remote control for stopping the dispensing operation may be provided. I have illustrated such a control as embodying an armature 108 on the rod 104 and cooperating with a coil 110 in circuit with one of the wires 84 and a third wire 111 built into the hose. A manually-controlled switch 112 built into the nozzle is in circuit with these wires.

It will be understood that the various features of the invention can be considerably modified from that illustrated in the drawings and, in Figs. 11 and 12, I have shown one such modification wherein the friction sleeve carried by the meter-driven drum is automatically restored to initial position following each dispensing operation. The shaft 132 and fixed sleeve 129 correspond to the shaft 32 and sleeve 29 of Fig. 6. A drum 120 is keyed to the hub 121 of a worm gear 122 and the hub is mounted to rotate on the sleeve 129. An outer member or sleeve 124 of insulation material is frictionally mounted on the drum and is provided with a hub portion 125 of reduced diameter. A steel tape 126 is wound about this hub in a direction to rotate the same rearwardly as the tape is unwound. The tape extends downwardly and its end is attached at 126 to a hose-holding element 128. A spring 130 normally holds the element in its uppermost position, wherein it closes the motor switch 87.

The use of this modified feature is substantially as follows. The operator adjusts the indicator 38 to the position corresponding with the amount of liquid to be dispensed and removes the hose and places its nozzle within the receiving tank. The element 128, being relieved of the weight of the hose, moves to its uppermost position, thus leaving the tape free to move upwardly when the member 124 is rotated forwardly by the meter. Following the completion of the dispensing operation, the operator hangs the hose onto the element 128, which thereupon moves downwardly and restores the friction sleeve 124 to its initial position. The interlock 68—75 may be dispensed with when using this construction.

It will be understood that the controlling valve 77 may be located anywhere in the conduit beyond the meter, as may be found desirable. In Figs. 13 and 14, I have illustrated this valve 177 as located on the piping adjacent to the attached hose 178, the valve being normally closed by a spring and opened by a solenoid at 180, in the manner already described in connection with Figs. 1—10. In order to prevent draining of the hose, I mount a self-closing valve 181 in the nozzle 182. This valve is normally closed by a spring 183, strong enough to hold the valve closed against the weight of liquid in the hose when the valve 177 is closed. When the valve 177 is opened for dispensing, the pressure of liquid in the conduit readily opens the valve 181. It may in some cases be found desirable to provide more than one valve of the nature of valve 181, whereby to aid in supporting the weight of liquid in the hose. One or more such additional valves may be provided as indicated at 184.

Also, while I prefer to operate the controlling valve 77 electrically, it will be understood that other power, such as pneumatically-operated means, may be used. Such a means as shown in Fig. 15 may comprise a controlling valve 150 normally closed by a spring 151 and adapted to be opened by air pressure from a pipe 152 in communication with a cylinder 153. A rotary valve 155 controls the passage of air through the pipe 152. When the valve 155 is in the (first) position illustrated, the pipe is in communication with an exhaust pipe 156 and the valve 150 is closed. When the valve 155 is rotated 90° (second position), the pipe 152 is brought into communication with a pipe 157, providing air under pressure to the cylinder whereby to open the valve 150. The dispensing operation is started by rotating the valve 155 manually to said second position, whereupon the valve 150 is opened, and the dispensing operation is automatically stopped by a solenoid 158, which serves to rotate the valve 155 back to the first position when the contacts 56' and 57' are brought into engagement.

Cooperating mechanism for automatically restoring the friction sleeve 124 to its initial position at the end of each dispensing operation is shown in Fig. 16. This mechanism includes a cylinder 160 having a piston therein mounted on a piston rod 161. One end of a tape 162 is wound around the hub 124' of the friction sleeve and its other end is connected to the piston rod. Pipes 163 and 164 connect opposite ends of the cylinder to the valve 155. When the valve is in the position of Figs. 15 and 16, air pressure from a pipe 165 passes through ports 166 and 163 to the forward end of the cylinder and rotates the hub rearwardly. When the valve is rotated to its other position, the piston rod is moved to the position shown in broken lines in Fig. 16, wherein the friction sleeve is free to move forwardly. It will also be noted that the ends of the port 166 are cut away at 167 and 168, whereby to admit air early to the port 164 and thus free the friction sleeve prior to the opening of the valve 150.

I desire it to be understood that I have herein more particularly illustrated my invention in association with gasoline dispensing pumps as by way of example only, the invention having various other useful applications wherein the dispensing of a definite quantity of liquid is required. The dispensing of fuel oil from truck tanks may be mentioned as another valuable use therefor. Such a tank, equipped with my invention, may carry a large quantity of oil and deliver the same to various customers in predetermined amounts. When reaching the first customer, the operator need only set the device to deliver the quantity ordered and the dispensing will be automatically stopped when that amount has been delivered, the operator being free to attend to other matters during the dispensing operation. The remaining orders are filled in like manner, with a minimum of attention from the operator. Various mechanical changes in the mechanism illustrated will, of course, be found desirable and it will be understood that the invention is not limited in this respect, except as required by the appended claims.

Having thus described my invention, what I claim as new and desire to secure by Letters Patent is:

1. In a liquid dispensing device, a pipe for conducting liquid, a meter in the pipe for measuring the liquid flow, a member operated from the meter along a fixed path, a second member adjustable along and in said path relative to the first member, means including an indicator for so adjusting the second member to predetermined positions, and means including said members for automatically checking the liquid dispensing operation when the first member reaches a predetermined position relative to the second member.

2. The device set forth in claim 1, in which the second-named means includes an electric switch operated by the first and second-named members at the said relative predetermined position thereof.

3. In a liquid dispensing device, a pipe for conducting liquid, a meter in the pipe for measuring the liquid flow, a member operated from the meter, a second member adjustably carried by the first member and movable therewith along a fixed path, a third member adjustable along and in said path relative to the second member, means including an indicator for so adjusting the third member to predetermined positions, and means including the second and third members for automatically checking the liquid dispensing operation when the second member contacts with the third member.

4. In a liquid dispensing device, a pipe for conducting liquid, a meter in the pipe for measuring the liquid flow, a member rotated from the meter, a second member frictionally connected to rotate with the first member, a third member adjacent to and rotatably adjustable relative to the second member, means including an indicator for so adjusting the third member to predetermined positions, and means including the second and third members for automatically checking the liquid dispensing operation when the second member reaches a predetermined position relative to the third member.

5. In a liquid dispensing device, a pipe for conducting liquid, a meter in the pipe for measuring the liquid flow, a member rotated from the meter, a second member adjustably carried by the first member, a third member adjacent to and rotatably adjustable relative to the second member, means including an indicator for so adjusting the third member to predetermined positions, and means including cooperating elements carried by the second and third members for automatically checking the liquid dispensing operation when the elements come into contact, said elements providing abutment surfaces whereby the second member may rotate the third member and the indicator.

6. The device set forth in claim 5, plus a stop for limiting rearward rotation of the second member to an initial position, and means preventing forward rotation of the third member except when the second member is in said initial position.

7. In a liquid dispensing device, a pipe for conducting liquid, a meter in the pipe for measuring the liquid flow, a hose connected to the pipe beyond the meter, means for receiving and supporting the free end of the hose, a member rotated from the meter, a second member adjustably carried by the first member, a third member adjacent to and rotatably adjustably relative to the second member, means including an indicator for adjusting the third member to predetermined positions, means for automatically checking the liquid dispensing operation when the second member reaches a predetermined position relative to the third member, and means whereby the first-named means returns the second member to an initial position when the hose is hung onto the first-named member.

8. In a liquid dispensing device, a pipe for conducting liquid, a meter in the pipe for measuring the liquid flow, a hose connected to the pipe beyond the meter, a nozzle at the free end of the hose and including a normally closed valve and a solenoid for opening the valve, means including an electric switch for energizing the solenoid and opening the valve, a member operated from the meter along a fixed path, a second member adjustable along and in said path relative to the first member, means including an indicator for so adjusting the second member to predetermined positions, and means including said members and a second switch for causing the first switch to open and the valve to close when the first member reaches a predetermined position relative to the second member.

9. In a liquid dispensing device, a conduit for conducting liquid, a meter in the conduit for measuring the liquid flow, a normally closed valve in the conduit beyond the meter, a motor for opening the valve, means for causing the motor to open the valve, a member operated from the meter along a fixed path, a second member adjustable along and in said path relative to the first member, means including an indicator for so adjusting the second member to predetermined positions, and means including said members and an electric switch operative on the first-named means to render the motor inoperative and cause the second-named valve to close when the first member reaches a predetermined position relative to the second member.

10. In a liquid dispensing device, a pipe for conducting liquid, a meter in the pipe for measuring the liquid flow, a hose connected to the pipe beyond the meter, a nozzle at the free end of the hose and including a spring closed valve opening automatically when the liquid pressure in the hose is greater than the force of the spring, a normally closed valve in the pipe beyond the meter, a motor for opening the normally closed valve, means for causing the motor to open the valve, a member operated from the meter along a fixed path, a second member adjustable along and in said path relative to the first member, means including an indicator for so adjusting the second member to predetermined positions, and means including said members and an electric switch operative on the first-named means to render the motor inoperative and cause the second-named valve to close when the first member reaches a predetermined position relative to the second member.

11. In a liquid dispensing device, a conduit for conducting liquid, a meter in the conduit for measuring the liquid flow, a normally closed valve in the conduit beyond the meter, a solenoid for opening the valve, means including an electric switch for energizing the solenoid and opening the valve, a member operated from the meter along a fixed path, a second member adjustable along and in said path relative to the first member, means including an indicator for so adjusting the second member to predetermined positions, means including said members and a second switch for causing the first switch to open and the valve to close when the first member reaches a predetermined position relative to the second member, and other means for causing the valve to open and be held open while the members are in the last-named predetermined position.

12. The device set forth in claim 11, plus means remote from the last-named means and under manual control for causing the valve to close.

13. In a liquid dispensing device, a conduit for conducting liquid, a meter in the conduit for measuring the liquid flow, a normally closed valve in the conduit beyond the meter, a solenoid for opening the valve, means including an electric switch for energizing the solenoid and opening the valve, a member operated from the meter along a fixed path, a second member adjustable along and in said path relative to the first member, means including an indicator for so adjusting the second member to predetermined positions, and means including and cooperating with the said members to cause de-energizing of the solenoid and closing of the valve when the first member reaches a predetermined position relative to the second member.

14. In a liquid dispensing device, a conduit for conducting liquid, a meter in the conduit for measuring the liquid flow, a valve in the conduit beyond the meter, a fluid pressure motor for opening the valve and holding it open, a valve for controlling the motor, and means cooperating with the meter and operative on the second valve to cause the first valve to close when a predetermined amount of liquid has been dispensed.

15. In a liquid dispensing device, a pipe for conducting liquid, a meter in the pipe for measuring the liquid flow, a member operated from the meter along a fixed path, a second member adjustably carried by the first member, a third member adjustable relative to the second member, means including an indicator for so adjusting the third member to predetermined positions, means including the second and third members for automatically checking the liquid dispensing operation when the second member reaches a predetermined position relative to the third member, and means thereafter automatically returning the second member to initial position relative to the first member.

LAWRIE L. WITTER.